UNITED STATES PATENT OFFICE.

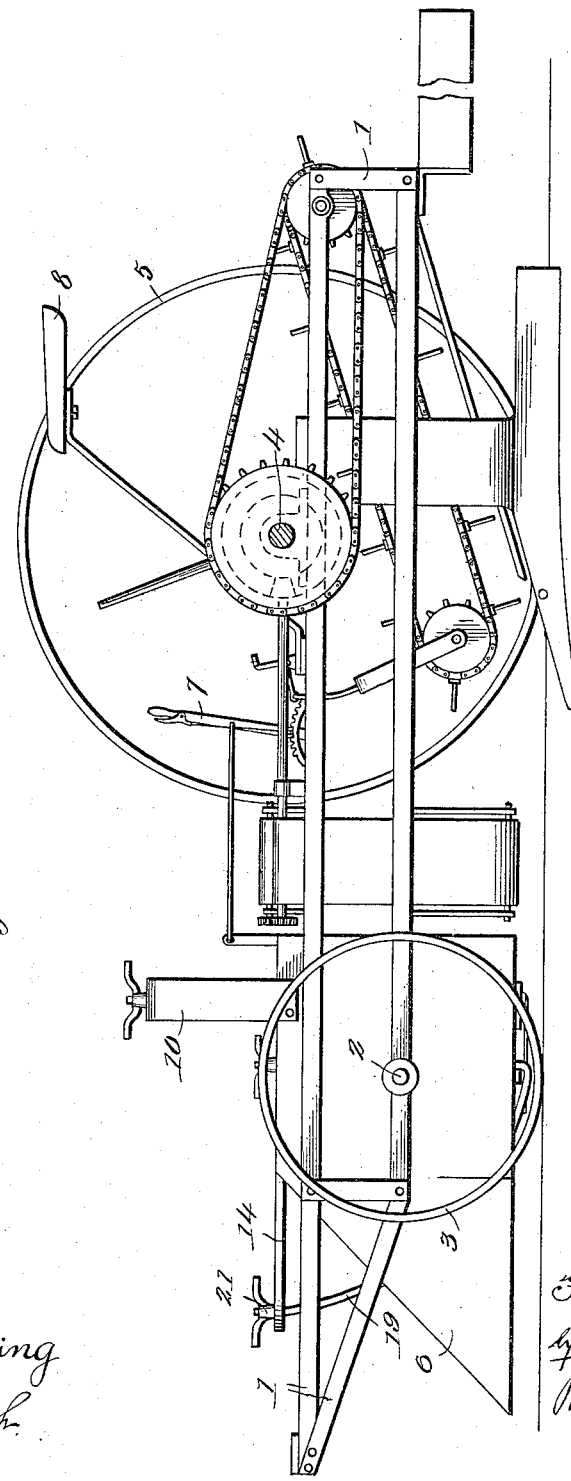

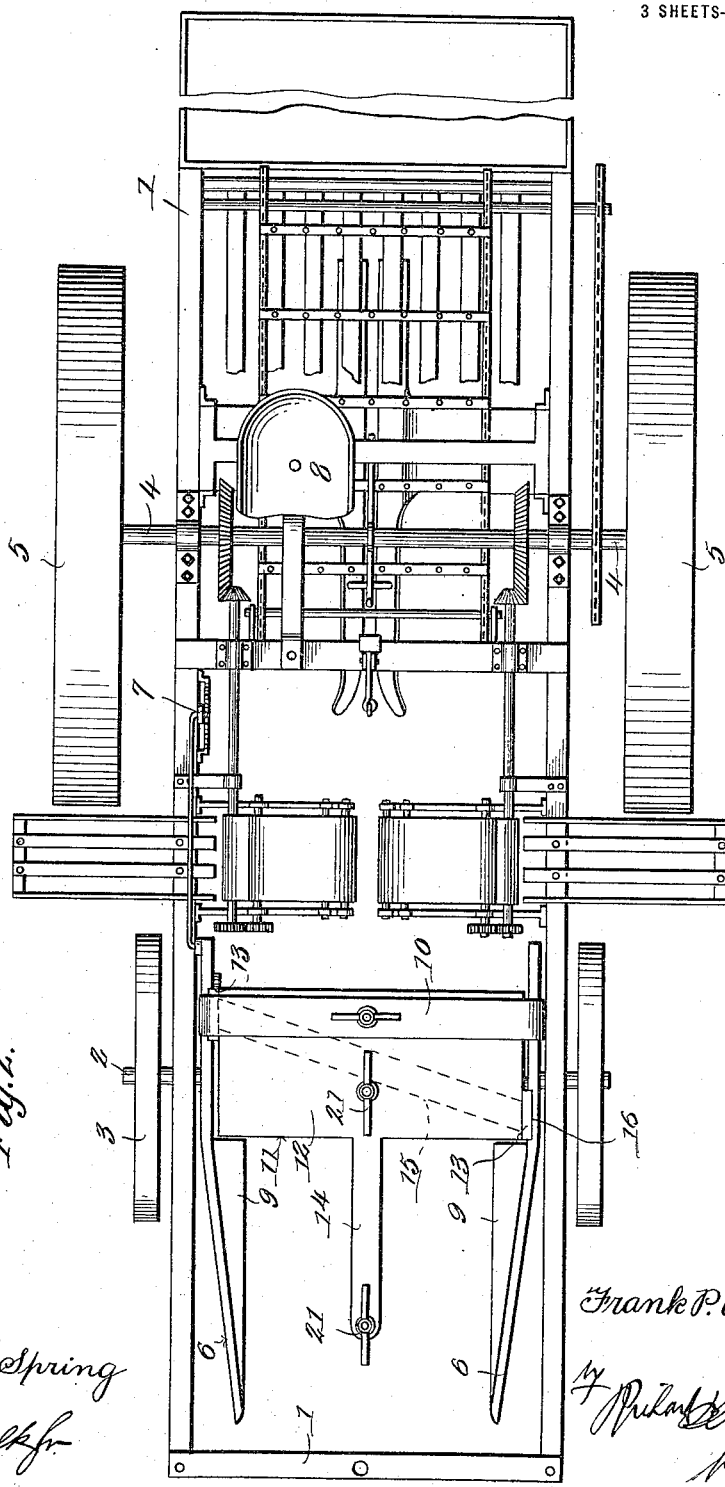

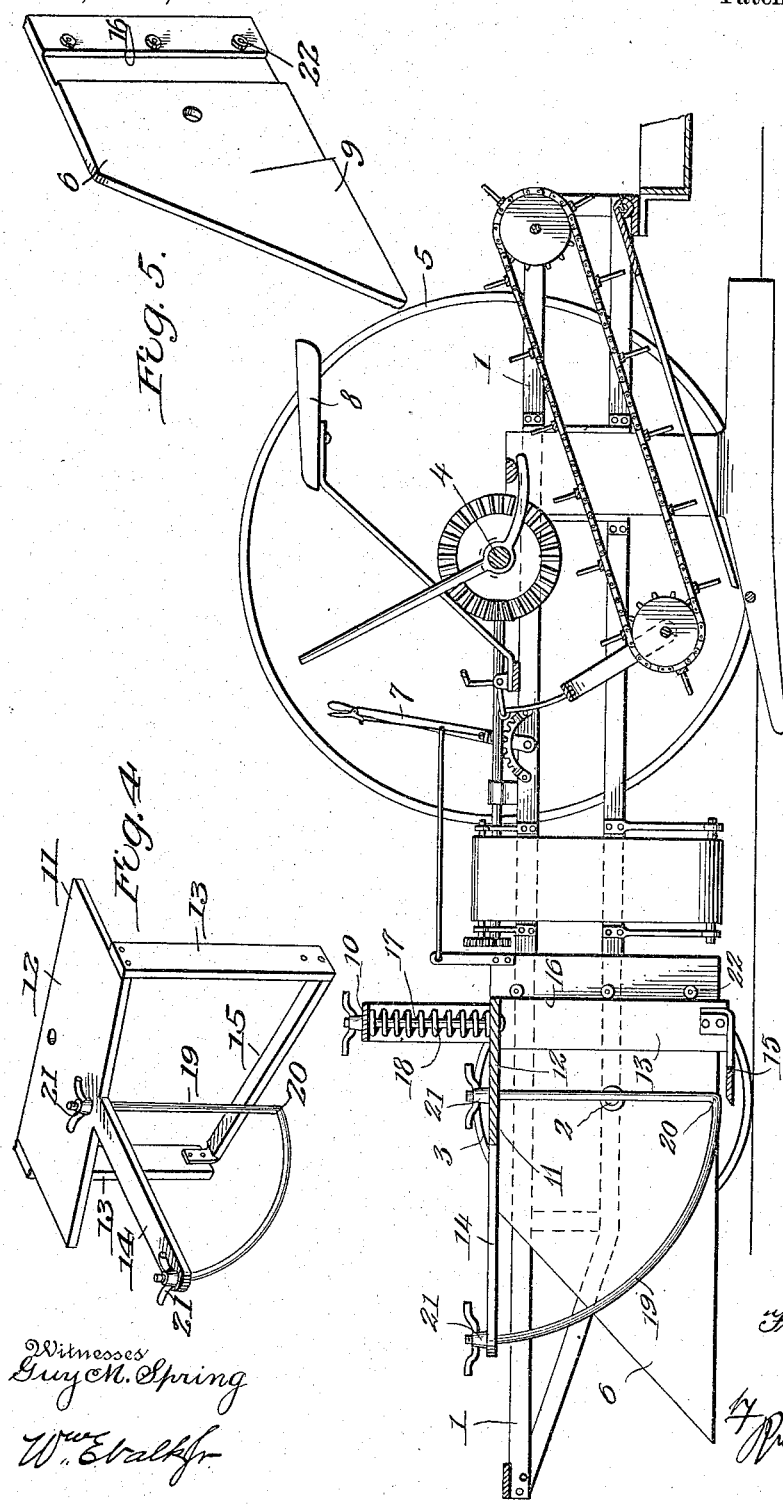

FRANK P. ADDLEMAN, OF AUSTIN, COLORADO.

BEET-HARVESTING MACHINE.

1,172,098.

Specification of Letters Patent.

Patented Feb. 15, 1916.

Application filed February 12, 1914. Serial No. 818,327.

*To all whom it may concern:*

Be it known that I, FRANK P. ADDLEMAN, citizen of the United States, residing at Austin, in the county of Delta and State of Colorado, have invented certain new and useful Improvements in Beet-Harvesting Machines, of which the following is a specification.

My invention relates to beet harvesting machines and specifically contemplates an improved topping mechanism constituting a part thereof.

The invention may be said to consist in the novel combination, construction and arrangement of parts to be hereinafter described and particularly pointed out in the claims.

In the drawings, annexed: Figure 1 is a side elevation of a beet harvesting machine constructed in accordance with the present invention, one of the rear wheels of the machine being removed; Fig. 2 is a top plan view of the machine; Fig. 3 is a longitudinal sectional view of the machine; Fig. 4 is a detail perspective view of the cutting device with its accessories; and Fig. 5 is a detail perspective view of one of the guide plates.

Like numerals of reference designate like or corresponding parts throughout the several views.

Referring now to the drawings by numerals, 1 designates as an entirety, the main frame of the machine, said frame comprising an upper and a lower frame section. Forwardly of the main frame 1 and carried by the lower frame section thereof is an axle 2 upon which the front wheels 3 of the machine are mounted. A main axle 4 is carried by the upper section of the main frame 1, said axle supporting the comparatively large rear wheel 5 of the machine.

At the forward end of the machine and between the respective sides of the main frame 1 are disposed a pair of guide plates, designated each in its entirety by the numeral 6, said plates being bodily adjustable through operation of a lever 7 positioned conveniently adjacent the operator's seat 8 of the machine. Each plate 6 converges toward the forward end of the machine and is extended inwardly at an angle toward the base of the plate as indicated at 9 to effect what might be termed a guide, the purpose of which is to concentrate the leaves of the beet plant and direct the same toward the cutting device to be subsequently described. The said plates 6 are pivotally mounted, the front axle 2 of the machine serving as a pivot element therefor. A bridge plate 10 is connected at each end to the respective guide plates 6 and, as the operating lever 7 has connection with but one of the said plates, it is apparent that by reason of the said bridge plate, the former, or the two plates 6, will move in unison.

Between the guide plates 6, and mounted for vertical sliding movement, is a suitable blade carrying frame 11, said frame comprising a horizontally flat top plate 12, vertically extending side arms or extensions 13 and a forward extension 14, the latter being disposed in a horizontal plane. The arms or extensions 13 are disposed one at each end of the top plate 12, the arm at one end of the plate depending therefrom at a point adjacent one of the parallel longitudinal edges of the said plate while the arm at the opposite end thereof depends from a point adjacent the other of the longitudinal edges, this arrangement, causing the blade 15 connecting the said arms at their lower extremity to extend at an angle.

As shown to advantage in Fig. 5 of the drawings, each guide plate 6 is provided with a vertical groove 16, the groove of one plate being formed nearer the center of the plate than the groove of the other, this construction providing for the disposition of the arms 13 within the respective grooves. A bolt or pin 17 acts as a support for the blade carrying frame 11, said pin connecting the top plate 12 of the frame with the bridge plate 10 aforesaid. A spring 18 embraces the bolt 17 and abuts at one end against the bridge plate 10 and at its opposite end the top plate 12 of the frame 11, said spring, during operation of the machine, providing a yieldable support for the frame 11 as well as limiting in one direction the vertical movement thereof.

Automatic means for raising and lowering the blade 15 are provided, said means consisting of a guide rod 19, one end of which is adjustable with respect to the forward extension 14 of the top plate 12, and the opposite end with respect to the said plate, the said rod, as illustrated in Figs. 3 and 4 being so formed as to curve from its point of connection with the extensions 14 to a point 20 disposed upon a plane slightly above that of the blade 15. By the provision of the guide rod, and by reason of its disposition with respect to the blade 15, it is apparent that the beet plant acted upon, during a forward movement of the machine will contact or engage the curved portion of the rod, which engagement, by reason of the immobility of the said rod, will cause the entire frame 11 to be either raised or lowered according to the size of the said plant to in this manner automatically adjust the blade 15 so as to cause the latter to only remove or sever the top or that portion of the beet plant desired. Adjustment of the rod may be effected through manipulation of thumb nuts 21 threaded upon the respective extremities of the said rod. If desired, rollers 22 may be mounted upon each guide plate 6 to engage the arms 13 of the frame 11, the said rollers being adapted for engagement for one of the longitudinal edges of each arm to assist or facilitate vertical movement of the said frame.

In reduction to practice, I have found that the form of my invention, illustrated in the drawings, and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claims.

Having thus fully described my invention, what I claim as new and desire to secure by Letters Patent, is:—

1. In a beet harvesting machine, the combination, of a main frame, guide means adjustable upon said frame, said means comprising a pair of converging plates disposed one at each side of the said frame, an auxiliary frame reciprocable relatively to said plates, an angularly disposed blade member carried by said auxiliary frame, means engageable with said frame to normally maintain same in its lowermost position, and means positioned forwardly of said frame and adjustable relatively thereto, said means being engageable with the beets acted upon for automatically moving said blade into cutting position.

2. In a beet harvesting machine, the combination, of guide means for the beets acted upon, said means comprising a pair of converging spaced apart plates, each plate having a vertical groove formed therein, a second frame reciprocable relatively to said plates, means forming a part of said last mentioned frame, said means operating within said groove, the latter serving as guides therefor, resilient means engageable with said second frame to normally maintain same in its lowermost position, an angular blade member carried by said frame, and means positioned forwardly of said frame, and between the said plates, said means being engageable with the beets acted upon for automatically moving said plate into cutting position, as and for the purpose set forth.

3. In a beet harvesting machine, the combination with the main frame, of plates affixed to the frame, each plate having a vertical groove formed therein, an enlargement formed upon each plate adjacent its forward end, the enlargements acting as guides directing the beets acted upon between the plates, a cutter frame mounted for reciprocal movement relatively to the plates, the frame sides fitting the groove in the said plates, a cutting element movable with the frame, an extension projecting forwardly of the frame, and a member adjustable relatively to the extension and to the frame, said member being engageable with the beets acted upon to direct the cutting element onto the beets and to gage the depth of the cut, as and for the purpose set forth.

In testimony whereof I affix my signature in presence of two witnesses.

FRANK P. ADDLEMAN.

Witnesses:
  JOSEPH T. BENEFIEL,
  THOS. M. RITTER.

Copies of this patent may be obtained for five cents each, by addressing the "Commissioner of Patents, Washington, D. C."